United States Patent
La Rosa (10) Patent No.: US 11,546,177 B2
(45) Date of Patent: *Jan. 3, 2023

(54) DEVICE OF PHYSICALLY UNCLONABLE FUNCTION WITH FLOATING GATE TRANSISTORS, AND MANUFACTURING METHOD

(71) Applicant: STMicroelectronics (Rousset) SAS, Rousset (FR)

(72) Inventor: Francesco La Rosa, Rousset (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 404 days.

This patent is subject to a terminal disclaimer.

(21) Appl. No.: 16/784,495

(22) Filed: Feb. 7, 2020

(65) Prior Publication Data

US 2020/0274723 A1 Aug. 27, 2020

(30) Foreign Application Priority Data

Feb. 22, 2019 (FR) ...................................... 1901791

(51) Int. Cl.
*H04L 29/06* (2006.01)
*H04L 9/32* (2006.01)
(Continued)

(52) U.S. Cl.
CPC ........ *H04L 9/3278* (2013.01); *G11C 16/0441* (2013.01); *G11C 16/10* (2013.01);
(Continued)

(58) Field of Classification Search
CPC . H04L 9/3278; H04L 9/0656; G11C 16/0441; G11C 16/10; G11C 16/28; G11C 16/30
(Continued)

(56) References Cited

U.S. PATENT DOCUMENTS 5,268,320 A 12/1993 Holler et al.
10,833,027 B2 11/2020 Lisart et al.
(Continued)

OTHER PUBLICATIONS

Charles Herder, Meng-Day, Physical Unclonable Functions and Applications: A Tutorial (Year: 2014).*
(Continued)

*Primary Examiner* — Andrew J Steinle
(74) *Attorney, Agent, or Firm* — Slater Matsil, LLP (57) ABSTRACT

In accordance with an embodiment, a physically unclonable function device includes a set of floating gate transistor pairs, floating gate transistors of the set of floating gate transistor pairs having a randomly distributed effective threshold voltage belonging to a common random distribution; a differential read circuit configured to measure a threshold difference between the effective threshold voltages of floating gate transistors of floating gate transistor pairs of the set of floating gate transistor pairs, and to identify a floating gate transistor pair in which the measured threshold difference is smaller than a margin value as being an unreliable floating gate transistor pair; and a write circuit configured to shift the effective threshold voltage of a floating gate transistor of the unreliable floating gate transistor pair to be inside the common random distribution.

21 Claims, 7 Drawing Sheets

(51) Int. Cl.
G11C 16/04 (2006.01)
G11C 16/10 (2006.01)
G11C 16/28 (2006.01)
G11C 16/30 (2006.01)
H04L 9/06 (2006.01)

(52) U.S. Cl.
CPC .............. *G11C 16/28* (2013.01); *G11C 16/30* (2013.01); *H04L 9/0656* (2013.01)

(58) Field of Classification Search
USPC ........................................................ 713/189
See application file for complete search history.

(56) References Cited

U.S. PATENT DOCUMENTS

| | | | |
|---|---|---|---|
| 2008/0068892 A1* | 3/2008 | Hosono | G11C 16/3418 365/185.2 |
| 2018/0277496 A1* | 9/2018 | Lisart | H01L 23/576 |
| 2019/0139612 A1* | 5/2019 | Kim | G11C 29/04 |
| 2020/0035624 A1* | 1/2020 | Marinet | G11C 16/14 |
| 2020/0105356 A1* | 4/2020 | Kulkarni | H04L 9/3278 |
| 2020/0274722 A1* | 8/2020 | La Rosa | G11C 16/10 |
| 2020/0274723 A1 | 8/2020 | La Rosa | |

OTHER PUBLICATIONS

Bhargava, Mudit et al., "A High Reliability PUF Using Hot Carrier Injection Based Response Reinforcement", SpringerLink, Cryptographic Hardware and Embedded Systems—CHES 2013, vol. 8086, Aug. 20-23, 2013, 18 pages.

Bohm, Christoph et al., "A Reliable Low-area Low-power PUF-based Key Generator", UPCommons, Global access to UPC Knowledge, 6th Conference on Trustworthy Manufacturing and Utilization of Secures Devices (TRUDEVICE 2016) Universitat Politecnica De Catalunya Barcelonatech, Nov. 14-16, 2016, 6 pages.

Cai, Yu et al., "Error Patterns in MLC NAND Flash Memory: Measurement, Characterization, and Analysis", IEEE Design, Automation & Test in Europe Conference & Exhibition, Mar. 12-16, 2012, 6 pages.

Courbon, Frank et al., "Direct Charge Measurement in Floating Gate Transistors of Flash EEPROM using Scanning Electron Microscopy", Semantic Scholar, Materials Science, doi:10.17863/cam. 7629, Nov. 6-10, 2016, 9 pages.

Dhar, Rudra Sankar "Direct Charge Measurements to read back stored data in nonvolatile memory devices using scanning capacitance microscopy", J. Vac. Sci. & Technol., B, 31, 061801, https://doi.org/10.1116/1.4825200, Oct. 15, 2013, 7 pages.

Dhar, Rudra S., et al., "Read Back of Stored Data in Non Volatile Memory Devices by Scanning Capacitance Microscopy", ResearchGate, Mater. Res. Soc. Symp. Proc., vol. 1527, Mar. 20, 2013, 8 pages.

Islam, Md Nazmul et al., "On Enhancing Reliability of Weak PUFs via Intelligent Post-Silicon Accelerated Aging", IEEE Transactions on Circuits and Systems—I: Regular Papers, vol. 65, No. 3, Mar. 2018, 10 pages.

Herder, Charles, "Physical Unclonable Functions and Applications: A Tutorial", Proceedings of the IEEE, vol. 102, No. 8, Aug. 2014, 16 pages.

* cited by examiner

Fig.1A

PRIOR ART

Fig.1B

PRIOR ART

DEVICE OF PHYSICALLY UNCLONABLE FUNCTION WITH FLOATING GATE TRANSISTORS, AND MANUFACTURING METHOD

This application claims priority to French Patent Application No. 1901791, filed on Feb. 22, 2019, which application is hereby incorporated herein by reference.

TECHNICAL FIELD

Implementations and embodiments of the invention relate to physically unclonable functions (PUFs), in particular in structures comprising floating-gate transistors.

BACKGROUND

A physically unclonable function allows a unique unpredictable code that depends on random physical attributes to be generated automatically. Thus, it is very difficult, if not impossible, to clone such a function.

On the one hand, it is desirable for physically unclonable functions to be robust enough for them not to vary in particular over time, following repeated use or in case of temperature variations. On the other hand, it is desirable for the random variations in the physical attributes to be easily identifiable, in order to make it possible to unequivocally discriminate between various data. Furthermore, it is desirable for the production of physically unclonable functions to require no or few dedicated fabrication steps.

The unique unpredictable codes typically comprise a sequence of random data and are mainly used as encryption keys. These data are typically secret.

This being so, techniques exist, in particular techniques employing scanning capacitance microscopy (SCM) or scanning electron microscopy (SEM), that are capable of extracting the secret data, i.e. capable of reading the data by measurement, inspection and/or analysis.

This is particularly the case with conventional structures that aim to achieve robust data retention and data readability. Specifically, conventional techniques, which increase the capacity to retain and to discriminate between data for read-out, generally also increase the capacity of extraction techniques to discriminate between the data.

SUMMARY

In accordance with an embodiment, a physically unclonable function device includes a set of floating gate transistor pairs, floating gate transistors of the set of floating gate transistor pairs having a randomly distributed effective threshold voltage belonging to a common random distribution; a differential read circuit configured to measure a threshold difference between the effective threshold voltages of floating gate transistors of floating gate transistor pairs of the set of floating gate transistor pairs, and to identify a floating gate transistor pair in which the measured threshold difference is smaller than a margin value as being an unreliable floating gate transistor pair; and a write circuit configured to shift the effective threshold voltage of a floating gate transistor of the unreliable floating gate transistor pair to be inside the common random distribution.

In accordance with another embodiment, a method includes providing a set of floating gate transistor pairs, wherein effective threshold voltages of floating gate transistors of the set of floating gate transistor pairs are randomly distributed according to a common random distribution; measuring a threshold difference between effective threshold voltages of floating gate transistors of the set of floating gate transistor pairs, and identifying a floating gate transistor pair of the set of floating gate transistor pairs in which the measured threshold difference is smaller than a margin value as being an unreliable transistor pair; and shifting the effective threshold voltage of a floating gate transistor of the unreliable floating gate transistor pair to be within the common random distribution.

In accordance with a further embodiment, an integrated circuit includes a plurality of floating gate transistor pairs, wherein a first floating gate transistor of each floating gate transistor pair of the plurality of floating gate transistor pairs is coupled to a first bit line, and a second floating gate transistor of each floating gate transistor pair of the plurality of floating gate transistor pairs is coupled to a second bit line, and floating gate transistors of the plurality of floating gate transistor pairs have a randomly distributed effective threshold voltage according to a common random distribution; a read circuit having a first input coupled to the first bit line and a second input coupled to the second bit line, wherein the read circuit is configured to measure a threshold difference between the first floating gate transistor and the second floating gate transistor of each floating gate transistor pair of the plurality of floating gate transistor pairs, and compare the measured threshold difference with a predetermined threshold; and a write circuit coupled to gates of the first floating gate transistor and the second floating gate transistor of each floating gate transistor pair of the plurality of floating gate transistor pairs, wherein the write circuit is configured to shift the effective threshold voltages of the first floating gate transistor and the floating gate second transistor of each floating gate transistor pair to cause the measured threshold difference to be greater than the predetermined threshold and within the common random distribution.

BRIEF DESCRIPTION OF THE DRAWINGS

Other advantages and features of the invention will become apparent on examining the detailed description of completely non-limiting implementations and embodiments, and the appended drawings, in which.

DETAILED DESCRIPTION OF ILLUSTRATIVE EMBODIMENTS

Implementations and embodiments of the invention relate to physically unclonable functions (PUFs), in particular in structures comprising floating-gate transistors.

According to one embodiment, the differential read circuit is furthermore configured to read a logic state of a pair of floating-gate transistors, which logic state is defined by a difference, between the values of the effective threshold voltages of the pair, larger than the margin value.

According to one embodiment, the write circuit is configured to shift the effective threshold voltage of a floating-gate transistor of each unreliable pair so as to increase the difference, between the effective threshold voltages, above the margin value.

According to one embodiment, the write circuit, to shift the effective threshold voltage of a floating-gate transistor, is configured to generate a succession of write pulses each of which injects an elementary amount of charge into the floating gate of the floating-gate transistor.

According to one embodiment, the differential read circuit is configured to perform a margin verification between certain at least of the write pulses, the margin verification comprising comparing the difference between the values of the effective threshold voltages of the pair of floating-gate transistors with the margin value.

According to one embodiment, the logic states of the set of pairs of floating-gate transistors are intended to form a sequence of random data.

An integrated circuit may comprise a physically-unclonable-function device such as defined in the latter embodiment, and an encryption device configured to encrypt data using a key, the key advantageously comprising the sequence of random data.

According to another aspect, a process is provided, the process comprising a production of a physically unclonable function, the production comprising: fabricating a set of pairs of floating-gate transistors, intended to have the same threshold voltage; a random dispersion of the effective values of the threshold voltages of the floating-gate transistors forming a common random distribution of the threshold voltages of the floating-gate transistors; measuring the difference between the effective threshold voltages of the pairs of floating-gate transistors, and identifying what are called unreliable pairs of floating-gate transistors the difference between the effective threshold voltages of which is smaller than a margin value; shifting the effective threshold voltage of a floating-gate transistor of each unreliable pair in a controlled and limited way so that the shifted threshold voltage remains inside the common random distribution.

According to one implementation, the common random distribution is a distribution of threshold voltages of virgin floating-gate transistors that have never been written to.

According to one implementation, the process furthermore comprises reading a logic state of a pair of floating-gate transistors, which logic state is defined by a difference, between the values of the effective threshold voltages of the pair, larger than the margin value.

For example, the shifting comprises increasing the difference, between the effective threshold voltages of the floating-gate transistors of the unreliable pairs, above the margin value.

According to one implementation, the shifting of the effective threshold voltage of one of the floating-gate transistors of an unreliable pair comprises a succession of write pulses each of which injects an elementary amount of charge into the floating gate of the floating-gate transistor.

Advantageously, the shifting comprises a margin verification between certain at least of the write pulses, the margin verification comprising measuring the difference between the values of the effective threshold voltages of the pair of floating-gate transistors and comparing the measured difference with the margin value.

According to one implementation, the logic states of the set of pairs of floating-gate transistors are intended to form a sequence of random data.

An encryption method may advantageously comprise encrypting data using a key, the key comprising the sequence of random data obtained using a process such as defined by the latter implementation.

Figure 1A:
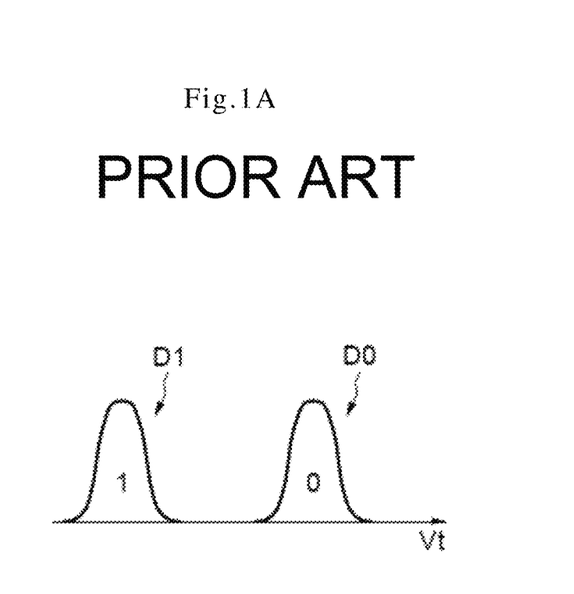
FIG. 1A illustrates a threshold distribution for a memory.

FIG. 1A illustrates a conventional technique aiming to achieve robust data retention and data readability, in which technique data are defined by levels of floating-gate-transistor threshold voltages Vt. The threshold-voltage levels are set by injecting positive or negative charge into the floating gates. First floating-gate transistors have a threshold voltage Vt belonging to a low-level distribution D1 allowing a first logic value, "1" for example, to be defined. Second floating-gate transistors have a threshold voltage Vt belonging to a high-level distribution D0 allowing a second logic value, "0" for example, to be defined.

Figure 1B:
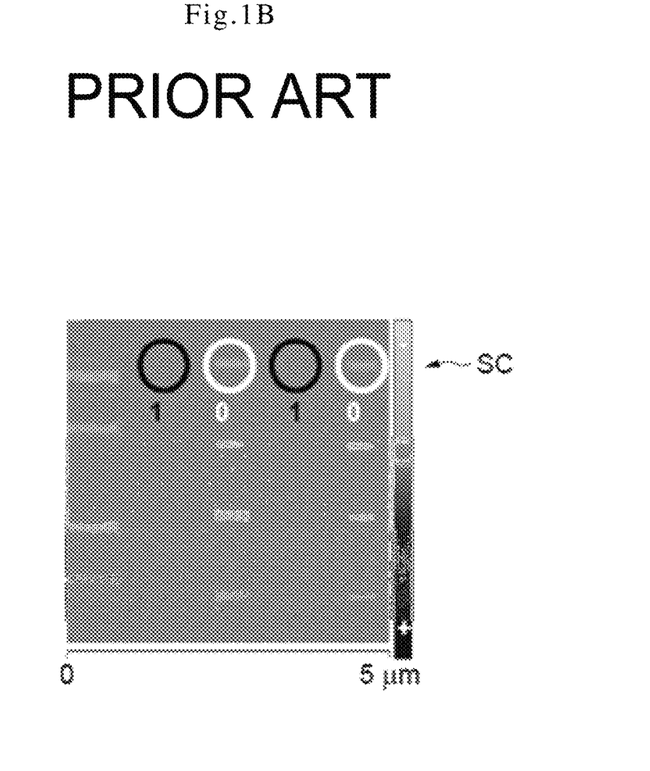
FIG. 1B illustrates a scanning capacitance micrograph SC of transistors storing data.

FIG. 1B illustrates a scanning capacitance micrograph SC of floating-gate transistors storing data using the technique presented with reference to FIG. 1A. The stored sequence of data 1010 is easily extractable if the position of the floating-gate transistors is known. Specifically, it is possible in the image SC to see the channel regions of the first floating-gate transistors (the threshold voltage of which belongs to the low-level distribution D1) in the black circles, and the channel regions of the second floating-gate transistors (the threshold voltage of which belongs to the high-level distribution D0) in the white circles. Of course this is problematic.

There is therefore a need to provide physically-unclonable-function structures that are robust with respect to exterior variations or ageing, and the data of which may be clearly discriminated between for read-out while being difficult to extract. It would furthermore be beneficial for the structures to be easy to produce in the existing technologies.

According to one aspect, a physically-unclonable-function device is provided, the device comprising a set of pairs of floating-gate transistors intended to have the same threshold voltage but each having an effective threshold voltage belonging to a common random distribution, a differential read circuit configured to measure the difference between the effective threshold voltages of the pairs of floating-gate transistors and to identify what are called unreliable pairs of floating-gate transistors the difference between the effective threshold voltages of which is smaller than a margin value, and a write circuit configured to shift the effective threshold voltage of a floating-gate transistor of each unreliable pair in a controlled and limited way so that the shifted threshold voltage remains inside the common random distribution.

Thus, the device according to this aspect benefits from the advantages of floating-gate-transistor data storage, i.e. very good retention capacities, robustness, and fabrication processes and operating parameters that are perfectly characterized. Since the effective threshold voltages all belong to a common random distribution, the function is not only physically unclonable but furthermore impossible to extract using the microscopy techniques of the art. In the unreliable pairs, the shift of an effective threshold voltage allows the viability of this technique to be guaranteed, and in particular the distinction to be ensured between two effective threshold voltages that are potentially equal or very close.

The common random distribution is advantageously a distribution of threshold voltages of virgin floating-gate transistors that have never been written to.

Figure 2:
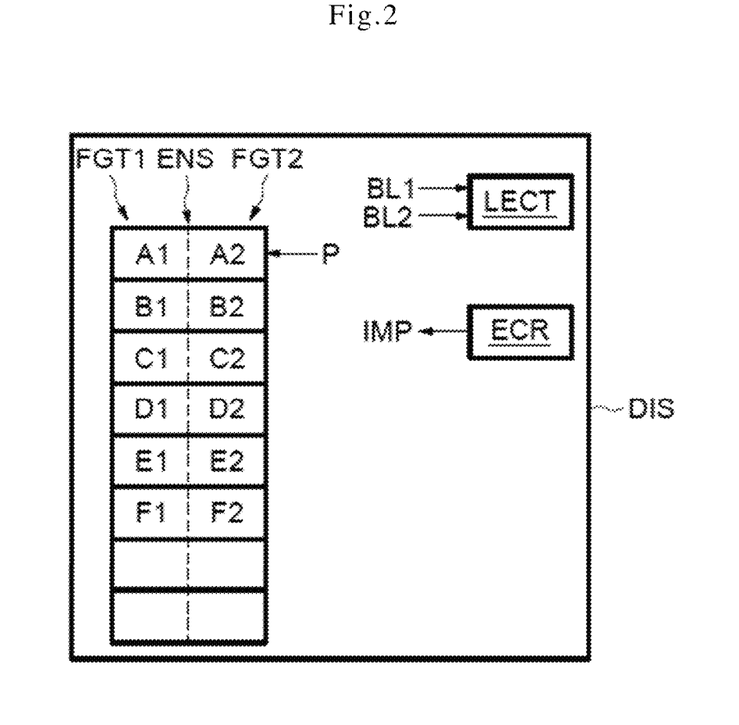
FIG. 2 illustrates an example embodiment of the invention.

FIG. 2 shows an example embodiment of a physically-unclonable-function device DIS. The device DIS comprises a set ENS of pairs P of floating-gate transistors FGT1, FGT2.

A floating-gate transistor conventionally comprises a source region and a drain region that are implanted in a semiconductor body, a channel region in the body between the source and drain regions, and an electrically conductive floating gate insulated from the channel region and from a control gate that surmounts the floating gate. The threshold voltage of a floating-gate transistor is the voltage, between the source region and the control gate, from which the channel region is depleted and conductive.

A floating-gate transistor is written to when charge is injected into the floating gate and trapped therein. The charge modifies, depending on its sign, the threshold voltage of the transistor written to, programming or erasure then being spoken of.

The floating-gate transistors FGT1, FGT2 of the set ENS are intended to have the same threshold voltage.

This being so, the effective threshold voltages, i.e. the actual values of the threshold voltages, vary slightly according to a random dispersion, for example due to physical fabrication variables. This type of dispersion is commonplace and known per se. The effective threshold voltages of the floating-gate transistors referenced FGT1 of each pair are referenced A1-F1 and the effective threshold voltages of the floating-gate transistors referenced FGT2 of each pair are referenced A2-F2.

Thus, the floating-gate transistors FGT1, FGT2 of the set ENS each have an effective threshold voltage belonging to a common random distribution.

In particular, the floating-gate transistors FGT1, FGT2 may advantageously be kept in a virgin state, i.e. no charge is injected into their floating gates. Thus, the common random distribution is, in this particular case, a distribution of threshold voltages Vteff of virgin floating-gate transistors that have never been written to.

Figure 3:
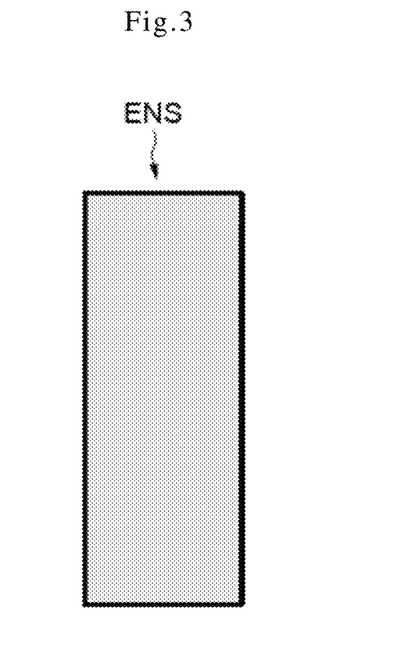
FIG. 3 illustrates an example embodiment of the invention.

FIG. 3 illustrates a scanning capacitance micrograph of the floating-gate transistors belonging to the set ENS. Each floating-gate transistor has an effective threshold voltage belonging to a common distribution of virgin floating-gate-transistor threshold voltages Vteff. Thus, it is impossible to see any distinction between the values of the threshold voltages using current-day microscopy techniques.

Alternatively, the floating-gate transistors FGT1, FGT2 of the set ENS may optionally all be programmed, i.e. all have negative charge on their floating gates, or be erased, i.e. have had a positive charge injected into their floating gates.

Referring once again to FIG. 2, the device DIS comprises a differential read circuit LECT configured to measure the difference between the effective threshold voltages of the pairs P of floating-gate transistors FGT1, FGT2.

The differential read circuit LECT comprises two differential inputs to which the floating-gate transistors FGT1, FGT2 of each pair P are respectively coupled, in particular via respective bit lines BL1, BL2.

Figure 4:
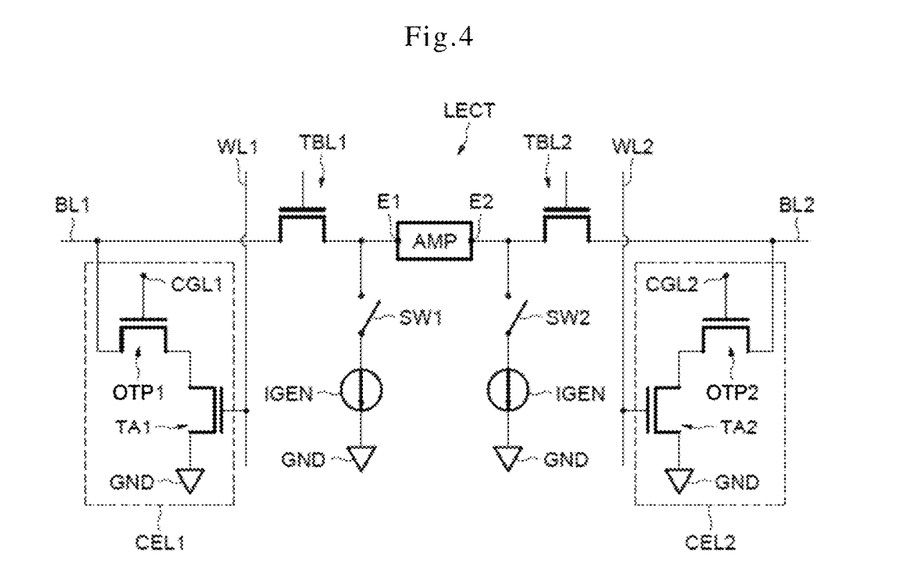
FIG. 4 illustrates an example embodiment of the invention.
Figure 5:
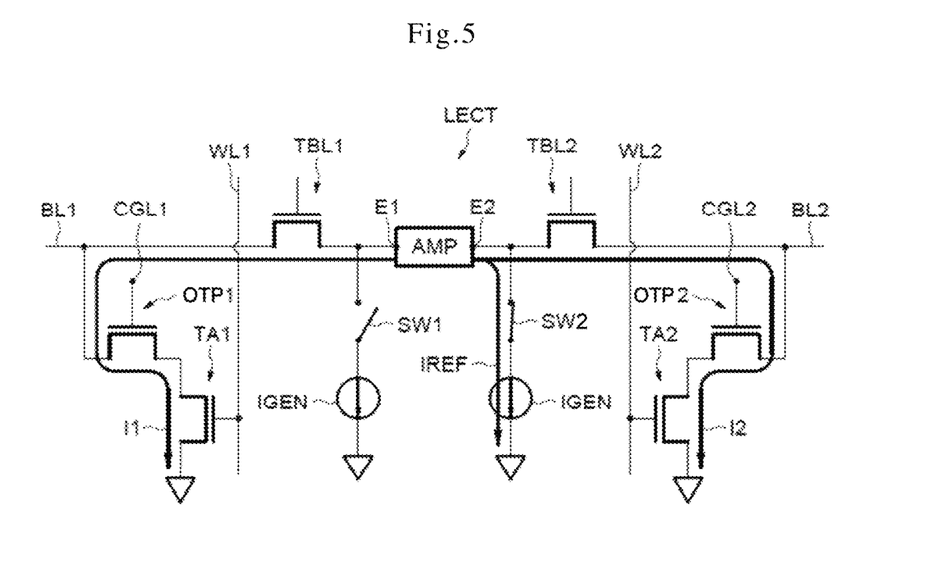
FIG. 5 illustrates an example embodiment of the invention.

In this regard, reference is now made to FIGS. 4 and 5.

FIG. 4 shows an example of an embodiment of the differential read circuit LECT coupled to the floating-gate transistors FGT1, FGT2 of one pair, via the respective bit lines BL1, BL2. In this example, the floating-gate transistors FGT1, FGT2 belong to respective memory cells CEL1, CEL2, in which an access floating-gate transistor TA1, TA2 is connected to the source of the floating-gate transistor FGT1, FGT2 via its drain and to ground GND via its source.

The access floating-gate transistors TA1, TA2 are controlled via their gates by a signal transmitted over a respective word line WL1, WL2. As will become clear below, the word lines WL1, WL2 may optionally be common to one pair, i.e. electrically connected, or even formed by the same electrically conductive line. The control gates of the floating-gate transistors FGT1, FGT2 are connected to a respective control gate line CGL1, CGL2. Likewise, the control gate lines CGL1, CGL2 may optionally be common to one pair of floating-gate transistors, i.e. electrically connected or even formed by the same electrically conductive line. The drains of the floating-gate transistors FGT1, FGT2 are for their part connected to a respective bit line BL1, BL2.

The bit line BL1 allows one of the floating-gate transistors FGT1 of the pair to be coupled to a first input E1 of a read amplifier AMP. The bit line BL2 allows the other floating-gate transistor FGT2 of the pair to be coupled to a second input E2 of the read amplifier AMP.

The other floating-gate transistors of the set ENS of pairs P are coupled to the read amplifier AMP in the same way, and respective input switches TBL1, TBL2 allow the bit lines BL1, BL2 of the desired pairs to be selected.

Furthermore, the read circuit LECT comprises reference current generators IGEN that generate a reference current IREF drawn by the first input E1 or the second input E2, depending on positions of respective switches SW1, SW2.

FIG. 5 shows an example of an embodiment of the differential read circuit LECT in operation. The read amplifier AMP is configured to amplify a difference between the current passed by its first input E1 and the current passed by its second input E2. In this regard, the input switches TB1A, TBL2 are controlled so as to couple the bit lines BL1, BL2 of the desired pair of floating-gate transistors. The access floating-gate transistor TA1, TA2 of each floating-gate transistor FGT1, FGT2 is turned on by a voltage transmitted over the word lines W1A, WL2. Likewise, the floating-gate transistors FGT1, FGT2 are controlled by a control gate voltage transmitted over the control gate lines CG1A, CGL2.

The floating-gate transistor FGT1 of the pair is thus placed to flow a read current I1 from the first input E1 to ground GND. The other floating-gate transistor FGT2 of the pair is likewise placed to flow a read current I2 from the second input E2 to ground GND.

Since the read current I1, I2 is representative of the effective threshold voltage of the respective floating-gate transistor FGT1, FGT2, the difference between the currents I1, I2 is representative of the difference between the effective threshold voltages of the pairs of floating-gate transistors FGT1, FGT2.

Thus, the differential read circuit LECT is capable of measuring the difference between the effective threshold voltages of the pairs of floating-gate transistors FGT1, FGT2.

Furthermore, an additional current IREF, generated by one of the reference current generators IGEN, may be added to one of the currents I1, I2 passed by the inputs E1, E2 via control of the switches SW1, SW2. In the example shown, the switch SW2 is closed and the current IREF is added to the current I2 of the second input E2.

This allows a difference between the effective threshold voltages to be measured relative to a certain margin. The value of the margin corresponds to the current IREF, which is representative of a reference voltage deviation. The margin value is in particular chosen depending on the precision of the differential read circuit LECT.

Figure 6:
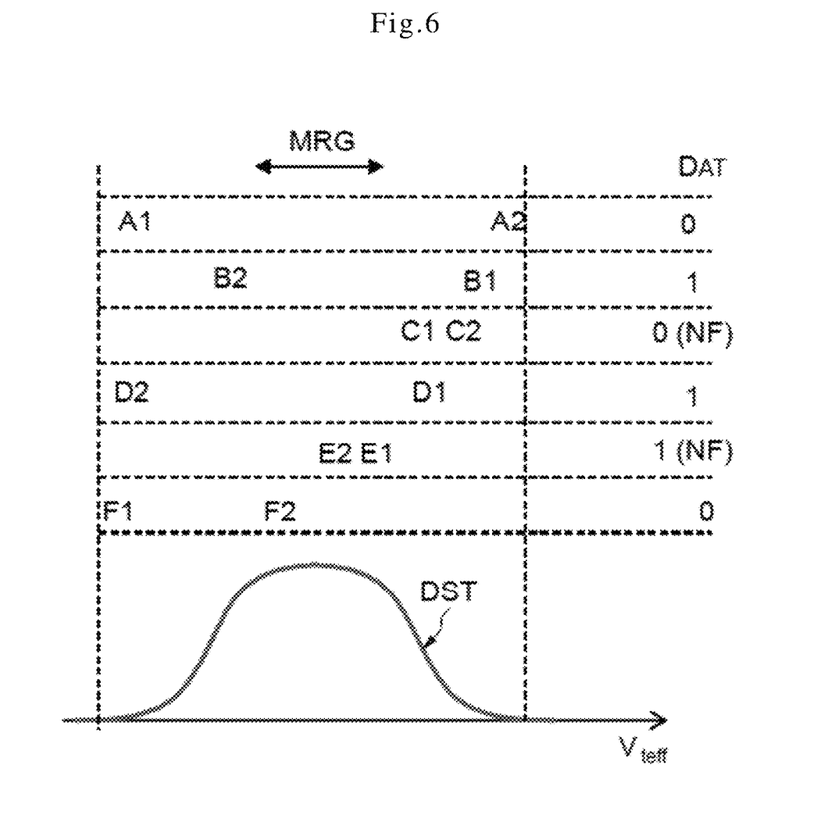
FIG. 6 illustrates an example embodiment of the invention.

Reference is now made to FIG. 6, which shows an example of various threshold-voltage values A1, B1, C1, D1, E1, F1 of one of the floating-gate transistors FGT1 of each pair of the set ENS, and the threshold-voltage values A2, B2, C2, D2, E2, F2 of the respective other floating-gate transistor FGT2 of each pair. The values A1-F1, A2-F2 all belong to the common random distribution DST of effective threshold voltages Vteff.

The differential read circuit LECT according to one example embodiment, for example such as described with reference to FIGS. 4 and 5, is also configured to read a logic state DAT of each pair of floating-gate transistors FGT1, FGT2. The logic state DAT is defined by the difference between the values of the effective threshold voltages of the pair larger than the margin value MRG. For example, if X1>X2+MRG, then DAT=1, and if X2>X1+MRG, then DAT=0, with X1 any one of the values A1-F1 and X2 any one of the values A2-F2, respectively.

Thus, logic states are obtained in a physically unclonable way using the random deviation of the values of the effective threshold voltages of the two floating-gate transistors of a pair. Given that these effective threshold voltages are close and belong to the common random distribution DST, it is impossible, by microscopic inspection, to discriminate between either of the two stored data.

It will be noted that in the figure certain pairs of threshold-voltage values, C1 C2 and E1 E2, may be close and have a deviation smaller than the margin value MRG. The pairs of floating-gate transistors having these pairs of values are said to be unreliable pairs NF.

Referring once more to FIG. 2, the differential read circuit LECT is configured to identify pairs P of floating-gate transistors that belong to so-called unreliable pairs NF, for example using a differential measurement such as described above with reference to FIGS. 4 and 5. A pair P of floating-gate transistors FGT1, FGT2 is said to be unreliable if the difference between the effective threshold voltages of the floating-gate transistors is smaller than a margin value, for example the margin value MRG such as described above with reference to FIGS. 4 and 5.

The device DIS lastly comprises a write circuit ECR capable in particular of generating write pulses IMP.

The write pulses IMP are configured to obtain conditions for soft programming the floating-gate transistors, so as to increment the threshold-voltage value of the floating-gate transistors via an injection of hot carriers into the floating gate.

In other words, contrary to conventional EEPROM memory erasure or programming pulses in which the drain-floating gate voltages are about 8 to 12 volts, the write pulses IMP are limited so that the drain-floating gate voltages are for example about 4.5 to 5 volts.

Furthermore, the generation of the write pulses is controlled, i.e. it for example comprises checking phases in order to regulate the generation of the pulses. In this respect, reference may be made to the example implementation described below with reference to FIG. 9.

Thus, contrary to conventional programming and erasure, which creates two populations of floating-gate transistors the threshold voltages of which are rigorously different (for example such as illustrated in FIG. 1A), the controlled and limited write pulses IMP allow the threshold voltage to be shifted sufficiently slightly to allow the new shifted threshold voltage to be reasonably considered to belong to the same common random distribution.

Figure 7:
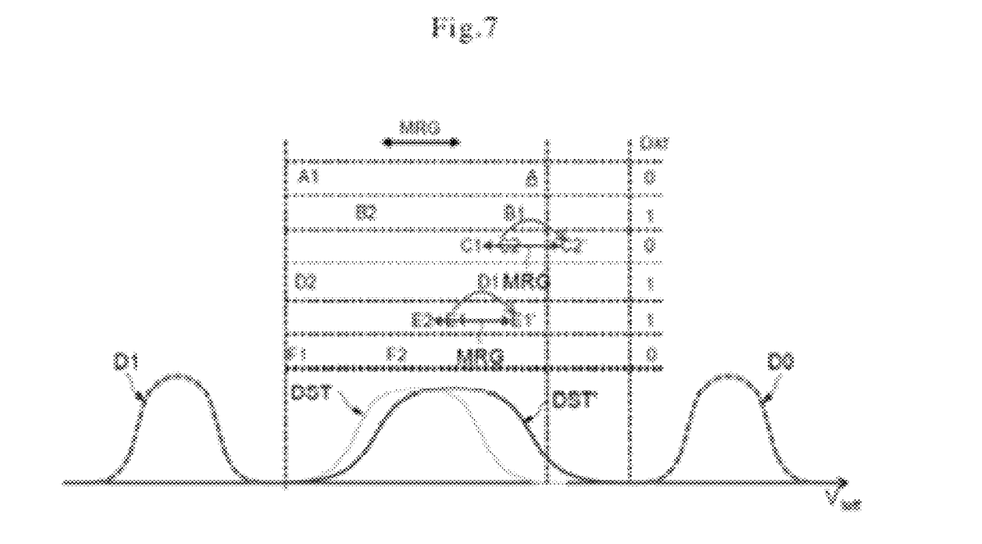
FIG. 7 illustrates an example embodiment of the invention.

In this regard, reference is made to FIG. 7, which returns to the example shown in FIG. 6, the effective threshold voltages C2 and E1 of one of the floating-gate transistors of each unreliable pair NF having been shifted to shifted values C2', E1'.

The write circuit ECR is configured to shift the effective threshold voltage C2, E1 of a floating-gate transistor of each unreliable pair NF so as to increase the difference, between the effective threshold voltages, above the margin value MRG.

This allows a logic state DAT defined by a difference, between the values of the effective threshold voltages of the pair, larger than the margin value MRG to be able to be reliably read in pairs identified as being unreliable pairs NF.

Of course, from a theoretical point of view, this implies a slight modification of the initial distribution DST into a shifted distribution DST'. This being so, it is reasonable to consider that the shifted values C2' and E1' belong to the initial common distribution, i.e. the common random distribution DST obtained on fabrication. Specifically, in comparison to a distribution D1 of threshold voltages of conventionally programmed transistors and to a distribution D0 of threshold voltages of conventionally erased transistors (also corresponding to FIG. 1A), the distributions DST and DST' are very similar and considered to be identical.

In other words, the write circuit ECR is configured to shift the effective threshold voltage of a floating-gate transistor of each unreliable pair NF in a controlled and limited way inside the common random distribution DST.

In any case, the values of the shifted threshold voltages are considered to be located inside the common random distribution DST provided that it is impossible to distinguish between them using scanning microscopy techniques.

The populations of programmed and erased transistors of the distributions D1, D0 may be distinguished between by microscope, but it is impossible to distinguish between the populations of floating-gate transistors of the initial and shifted distributions DST and DST'.

Figure 8:
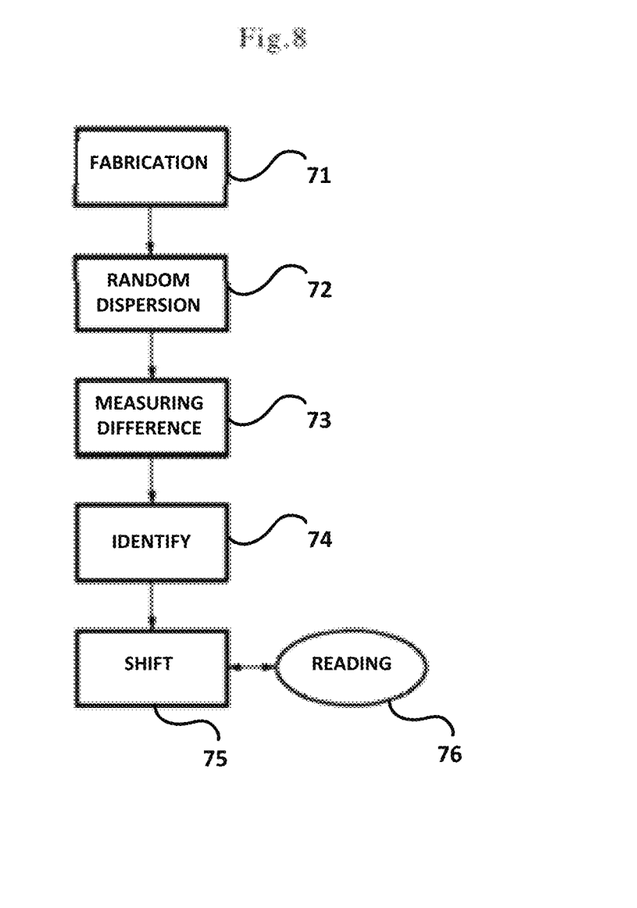
FIG. 8 illustrates an example implementation of the invention.

FIG. 8 shows an example of an implementation of a process in particular comprising producing a physically unclonable function. Certain references relate to FIGS. 2 to 7, which were described above.

The process comprises a step 71 of fabricating a set ENS of pairs P of floating-gate transistors FGT1, FGT2. The fabrication of the floating-gate transistors is identical so that the fabricated floating-gate transistors are intended to have the same threshold voltage.

For example, the transistors thus fabricated are intended to have the threshold voltages of virgin floating-gate transistors that have never been written to.

The process comprises a random dispersion 72 of the effective values of the threshold voltages Vteff of the floating-gate transistors. The dispersion is in particular due to physical fabrication variables, and thus directly accomplished, at least partially, in the fabricating step 71. The dispersion of the effective values forms a common random distribution DST of the threshold voltages of the floating-gate transistors of the set ENS.

It could be envisioned to implement, in a dedicated step or in the fabricating step 71, conditions intensifying the random dispersion.

The process comprises a step 73 of measuring the difference between the effective threshold voltages Vteff of the pairs of floating-gate transistors, and an identification 74 of pairs of floating-gate transistors that are said to be unreliable pairs NF, the difference between the effective threshold voltages of which is smaller than a margin value MRG.

Lastly, the process comprises shifting 75 the effective threshold voltage of a floating-gate transistor of each unreliable pair NF in a controlled and limited way inside the common random distribution DST.

The shifting 75 is implemented so as to increase the difference, between the effective threshold voltages of the floating-gate transistors of the unreliable pairs NF, above the margin value MRG.

Figure 9:
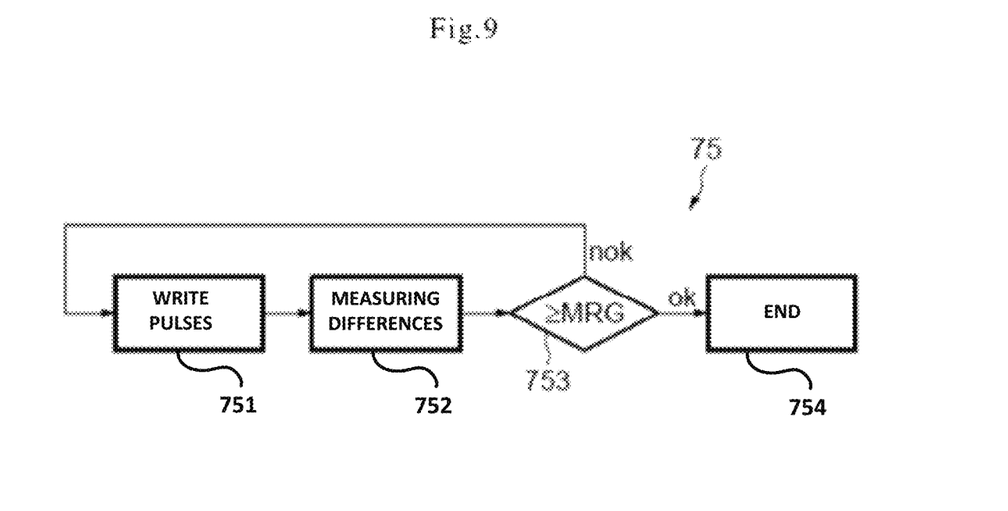
FIG. 9 illustrates an example implementation of the invention.

Reference is now made to FIG. 9, which illustrates an example of an implementation of the shifting 75. In this example, the shifting 75 of the effective threshold voltage comprises a succession of write pulses 751. Each write pulse 751 injects an elementary amount of charge into the floating gate of the floating-gate transistor the threshold voltage of which is to be shifted. In the sequence, a margin verification (752, 753) is carried out between certain at least of the write pulses 751. The margin verification comprises measuring 752 the difference between the values of the effective threshold voltages of the pair of floating-gate transistors, after the one or more write pulses 751, and then comparing 753 the measured difference with the margin value MRG.

If the measured difference 752 is smaller than the margin value MRG (nok), then a new cycle comprising a write pulse 751 and a margin verification 752, 753 is added to the sequence.

When the measured difference 752 is larger than or equal to the margin value MRG (ok), then the shifting 75 ends 754. By virtue of the margin verifications 752, 753 in the sequence of write pulses 751, the threshold voltages are shifted in a controlled way in order not to achieve threshold-voltage values located outside of the common random distribution DST obtained on fabrication.

Referring once again to FIG. 8, the process may furthermore comprise a step 76 of reading a logic state DAT of a pair of floating-gate transistors, which logic state is defined by a difference, between the values of the effective threshold voltages Vteff of the pair, larger than the margin value MRG.

The logic states DAT thus formed in the set ENS of pairs P of floating-gate transistors FGT1, FGT2 may for example be intended to form a sequence of random data.

Figure 10:
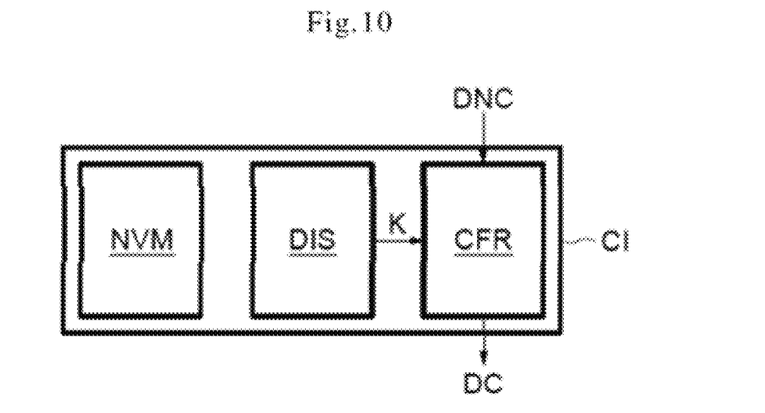
FIG. 10 illustrates an example embodiment of the invention.

FIG. 10 shows an integrated circuit CI comprising a physically-unclonable-function device DIS such as described above with reference to FIGS. 2 to 7, for example obtained using a process such as described above with reference to FIGS. 8 and 9.

In the device DIS, the logic states DAT of the set ENS of pairs P of floating-gate transistors FGT1, FGT2 are therefore intended to form a sequence of random data.

In this example, the integrated circuit CI is capable of executing an encryption method comprising encrypting CFR data DNC using a key K, the key K comprising the sequence of random data formed and stored in the set ENS of pairs of floating-gate transistors.

An encrypting circuit CFR, incorporated into the integrated circuit CI, is configured to encrypt the data DNC using the key K.

Furthermore, the integrated circuit CI may comprise a nonvolatile memory NVM, comprising memory cells each having a floating-gate state transistor advantageously fabricated in the same fabricating step 71 as the set ENS of pairs P of floating-gate transistors FGT1, FGT2.

In summary, a physically-unclonable-function technique in which a logic state is defined by the relative difference between two pieces of information belonging to the same distribution has been presented. The data cannot be extracted using prior-art methodologies: neither scanning capacitance microscopy (SCM) nor scanning electron microscopy (SEM). The technique does not require specific and dedicated processes.

Moreover, the invention is not limited to these embodiments but encompasses all the variants thereof, for example, even though the example embodiments described above with reference to FIGS. 4 and 5 relate to a current-mode differential read amplifier, the differential read-out may be performed in voltage-mode, or indeed, even though the direction of the shift illustrated in FIGS. 6 and 7 is an increase, a decrease may also be obtained by injecting charge of opposite sign.

What is claimed is:

1. A physically unclonable function device comprising:
   a set of floating gate transistor pairs, floating gate transistors of the set of floating gate transistor pairs having a randomly distributed effective threshold voltage belonging to a common random distribution;
   a differential read circuit configured to measure a threshold difference between the effective threshold voltages of floating gate transistors of floating gate transistor pairs of the set of floating gate transistor pairs, to identify a floating gate transistor pair in which the measured threshold difference is smaller than a margin value as being an unreliable floating gate transistor pair, and to detect a first logic state when the effective threshold of a first transistor of the transistor pair is greater than a sum of the effective threshold of a second transistor and the margin value and the read circuit is configured to detect a second logic state when the effective threshold of a second transistor of the transistor pair is greater than a sum of the effective threshold of the first transistor and the margin value; and
   a write circuit configured to shift the effective threshold voltage of a floating gate transistor of the unreliable floating gate transistor pair to be inside the common random distribution.

2. The device of claim 1, wherein the common random distribution is a distribution of threshold voltages of floating gate transistors that have never been written to.

3. The device according to claim 1, wherein the write circuit is configured to shift the effective threshold voltage of the floating gate transistor by generating conditions for hot carrier injection to trap charge in a gate dielectric of the floating gate transistor.

4. The device according to claim 3, wherein the write circuit is configured to generate the conditions for hot carrier injection by applying a succession of write pulses, each of which is configured to inject an elementary amount of charge into a floating gate of the floating gate transistor.

5. The device according to claim 4, wherein the differential read circuit is configured to perform a margin verification after at least one write pulse of the succession of write pulses, wherein performing the margin verification comprises comparing the measured threshold difference with the margin value.

6. The device according to claim 1, wherein the differential read circuit is further configured to read a logic state of a floating gate transistor pair of the set of floating gate transistor pairs, wherein the logic state is defined by voltage difference between the effective threshold voltages of the floating gate transistors of the floating gate transistor pair when the voltage difference exceeds the margin value.

7. The device according to claim 6, wherein the logic states of the set of floating gate transistor pairs form a sequence of random data.

8. An integrated circuit comprising:
   the physically unclonable function device according to claim 7; and an encryption device configured to encrypt data using a key, wherein the key comprises the sequence of random data.

9. A method, comprising:
providing a set of floating gate transistor pairs, wherein effective threshold voltages of floating gate transistors of the set of floating gate transistor pairs are randomly distributed according to a common random distribution;
measuring a threshold difference between effective threshold voltages of floating gate transistors of the set of floating gate transistor pairs, and identifying a floating gate transistor pair of the set of floating gate transistor pairs in which the measured threshold difference is smaller than a margin value as being an unreliable transistor pair;
shifting the effective threshold voltage of a floating gate transistor of the unreliable floating gate transistor pair to be within the common random distribution;
detecting a first logic state when an effective threshold of a first floating gate transistor of the set of floating gate transistor pairs is greater than a sum of an effective threshold of a second floating gate transistor of the set of floating gate transistor pairs and the margin value; and
detecting a second logic state when an effective threshold of the second floating gate transistor is greater than a sum of the effective threshold of the first floating gate transistor and the margin value.

10. The method according to claim 9, wherein the shifting comprises increasing the threshold difference of the unreliable floating gate transistor pair above the margin value.

11. The method according to claim 9, wherein the shifting of the effective threshold voltage of the floating gate transistor comprises applying a succession of write pulses that each injects an elementary amount of charge into a floating gate of the floating gate transistor.

12. The method according to claim 11, further comprising performing a margin verification after at least one write pulse of the succession of write pulses, wherein performing the margin verification comprises comparing the measured threshold difference with the margin value.

13. The method according to claim 9, further comprising reading a logic state of a floating gate transistor pair of the set of float gate transistor pairs, wherein the logic state is defined by the threshold difference when the threshold difference exceeds a margin value.

14. The method according to claim 13, wherein logic states of the set of floating gate transistor pairs form a sequence of random data.

15. The method of claim 14, further comprising encrypting data using a key, wherein the key comprises the sequence of random data.

16. The method of claim 9, further comprising fabricating the set of floating gate transistor pairs, wherein each transistor of the set of floating gate transistor pairs is fabricated to have a same nominal threshold voltage.

17. The method of claim 16, wherein the common random distribution is a distribution of threshold voltages of floating gate transistors that have never been written to.

18. An integrated circuit comprising:
a plurality of floating gate transistor pairs, wherein a first floating gate transistor of each floating gate transistor pair of the plurality of floating gate transistor pairs is coupled to a first bit line, and a second floating gate transistor of each floating gate transistor pair of the plurality of floating gate transistor pairs is coupled to a second bit line, and floating gate transistors of the plurality of floating gate transistor pairs have a randomly distributed effective threshold voltage according to a common random distribution;
a read circuit having a first input coupled to the first bit line and a second input coupled to the second bit line, wherein the read circuit is configured to measure a threshold difference between the first floating gate transistor and the second floating gate transistor of each floating gate transistor pair of the plurality of floating gate transistor pairs, and compare the measured threshold difference with a predetermined threshold; and
a write circuit coupled to gates of the first floating gate transistor and the second floating gate transistor of each floating gate transistor pair of the plurality of floating gate transistor pairs, wherein the write circuit is configured to shift the effective threshold voltages of the first floating gate transistor and the floating gate second transistor of each floating gate transistor pair to cause the measured threshold difference to be greater than the predetermined threshold and within the common random distribution, wherein:
a first set of floating gate transistor pairs of the plurality of floating gate transistor pairs comprise logic states;
each logic state is one of a first logic state or a second logic state;
the read circuit is configured to detect the first logic state when an effective threshold of the first floating gate transistor is greater than a sum of an effective threshold of the second floating gate transistor and the predetermined threshold; and
the read circuit is configured to detect the second logic state when the effective threshold of the second floating gate transistor is greater than a sum of the effective threshold of the first floating gate transistor and the predetermined threshold.

19. The integrated circuit of claim 18, wherein the read circuit comprises:
a read amplifier coupled to the first input and to the second input of the read circuit; and
a reference current generator coupled to the first input or the second input, wherein the read circuit is configured to compare the measured threshold difference with the predetermined threshold by activating the reference current generator and measuring a voltage difference between the first input and the second input.

20. The integrated circuit of claim 18, wherein the write circuit is configured to shift the effective threshold voltage of the first floating gate transistor or the second floating gate transistor of each floating gate transistor pair by applying at least one write pulse to a respective first floating gate transistor or second floating gate transistor.

21. The integrated circuit of claim 18, further comprising an encryption circuit coupled to the plurality of floating gate transistor pairs, wherein the encryption circuit is configured to use the logic states of the plurality of floating gate transistor pairs as an encryption key.

* * * * *